United States Patent
Hoang et al.

(10) Patent No.: US 7,200,626 B1
(45) Date of Patent: Apr. 3, 2007

(54) SYSTEM AND METHOD FOR VERIFICATION OF A QUIESCED DATABASE COPY

(75) Inventors: Courtney Chi Hoang, Fountain Valley, CA (US); Patricia Jean Keller, Westminster, CA (US); Alma Navarro de Jesus, Monrovia, CA (US); Donald Ralph Hart, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 483 days.

(21) Appl. No.: 10/762,723

(22) Filed: Jan. 22, 2004

(51) Int. Cl.
*G06F 17/30* (2006.01)

(52) U.S. Cl. ............ 707/204; 707/200; 707/100; 707/201

(58) Field of Classification Search ............ None
See application file for complete search history.

(56) References Cited

U.S. PATENT DOCUMENTS

| 5,675,579 A | 10/1997 | Watson et al. |
| 5,964,835 A | 10/1999 | Fowler et al. |
| 6,044,444 A | 3/2000 | Ofek |
| 6,453,325 B1 | 9/2002 | Cabrera et al. |
| 6,983,295 B1 * | 1/2006 | Hart ............... 707/204 |

* cited by examiner

*Primary Examiner*—Alford Kindred
*Assistant Examiner*—Belix Ortiz
(74) *Attorney, Agent, or Firm*—Alfred W. Kozak; Mark T. Starr; Richard J. Gregson

(57) ABSTRACT

A method is provided to verify a database copy of a primary database which has been replicated. A secondary physically consistent copy of the primary database is put in a state of quiesce while the primary database is allowed to resume update activity. The consistent copy, in a state of quiesce, can be used for database maintenance activities or as a recovery source should the primary database be damaged, but the consistent copy is first checked for integrity by using a Verify option before such recovery source is utilized.

7 Claims, 6 Drawing Sheets

SYSTEM AND METHOD FOR VERIFICATION OF A QUIESCED DATABASE COPY

CROSS-REFERENCES TO RELATED APPLICATIONS

The following U.S. patents and applications are incorporated by reference:

This application is related to co-pending application, U.S. Ser. No. 09/951,996 entitled "Method of Capturing A Physically Consistent Mirrored Snapshot of an Online Database."

This application is also related to co-pending application, U.S. Ser. No. 10/280,717 entitled "System and Method For Database Recovery Using A Mirrored Snapshot Of An Online Database which issued as U.S. Pat. No. 6,983,295."

This application is also related to co-pending application, U.S. Ser. No. 10/235,763 entitled "Method For Capturing A Physically Consistent Mirrored Snapshot Of An Online Database From A Remote Database Backup System", which issued as U.S. Pat. No. 6,957,221.

BACKGROUND OF THE INVENTION

1. Field of the Invention

This disclosure involves a method for the ability to verify the validity of a physically consistent database copy in a state of Quiesce prior to, or during, the recovery process so as to prevent subsequent wasting of time if inaccurate data has been allowed to accumulate.

2. Description of Related Art

The process of making a database unavailable for update activity is counter-productive to the goal of maintaining the database availability for 24 hours a day, 7 days a week and 365 days a year. Currently, with the present types of database systems, a database system must be taken off-line (QUIESCE) to create a physically consistent snapshot copy for the purpose of the offloading of database processing in a mirrored disk environment.

The present invention relates to the method of replicating an external physically consistent database copy from a primary on-line database system. An on-line database system maintains a logically consistent database by (i) reading data from disk storage into a system memory storage, then (ii) making changes to data by updating system memory storage, and then (iii) writing the changed data to disk storage at periodic intervals. When there are no active users of a database system, all the modified or changed data is written from the system memory storage to the disk storage, and then the system can be taken off-line with the database in a physically consistent state. However, with the advent of physically mirrored disk storage, the database system process of off-loading of a physically consistent copy is enabled and the performance can be improved, whereby the primary system remains available for normal operations and the secondary system is available for backup operations.

As previously stated, the process of making the database unavailable for update activity is counter-productive to the goal of maintaining 24 hour, 7 day a week, 365 days a year of database availability. Thus, if a physically consistent database copy could be created from a primary on-line database system, the database availability will still be maintained while the system performance is improved when a physically mirrored snapshot is used to off-load the processing.

An example of such a remote mirroring system is illustrated in U.S. Pat. No. 6,044,444 to Yuval Ofek of the EMC Corporation. This involves a data processing system which automatically and asynchronously, with respect to a first host system, generates and maintains a backup or "mirrored" copy of a primary storage device at a different location physically remote from the primary storage device. This is done without any intervention from the primary host which might seriously degrade the performance of the data transfer link between the primary host computer and its primary storage device.

This U.S. Pat. No. 6,044,444, provides a method of mirroring physical storage in order to create a duplicate copy, described as a "physically mirrored snapshot". However, this U.S. Patent to Ofek of EMC Corporation does not teach or show any method that provides full integrity checking of physical consistency in the duplicate copy, nor does this patent teach or show any method for verification of the duplicate copy.

A DMUTILITY program currently in the present invention provides the ability to recover data from a database or database copy that is marked as being in a state of QUIESCE. However, no one has ever provided the ability to verify the validity of the database copy prior to, or during the recovery process. This has now been accomplished.

A newly provided option to VERIFY a secondary database copy, therefore, will enable verification of a database copy marked as being in a state of QUIESCE. This option will be available with a DMUTILITY DBDIRECTORY statement, or with a DMUTILITY RECOVER statement. This verification will perform integrity checks for every Block of every structure or for all structures in the specified <dbdirectory list> of a DBDIRECTORY statement or the <recover spec> of a RECOVER statement. The integrity checks performed will include CHECKSUM and ADDRESSCHECK for structures that have CHECKSUM or ADDRESSCHECK database options set.

When the VERIFY option is requested with the DBDIRECTORY statement, any errors will be reported and handled in a manner consistent with existing reports and handling behavior when performing a DUMP with an indication: "**WARNING: THIS ROW LOCKED OUT (NOT ACCESSIBLE)." When all rows of all structures have been completed, a completion message is reported. If no errors were encountered, then the message "VERIFY OPTION IS COMPLETE, NO ROWS LOCKED OUT" will be given. If errors were encountered, the message "VERIFY OPTION IS COMPLETE, # ROWS LOCKED OUT" will be given, where the "#" will be replaced by the number of rows encountered with the CHECKSUM or ADDRESSCHECK integrity errors. If the VERIFY option is used with the RECOVER command and integrity errors were found, then the following message is given and the RECOVERY activity will not start; "AX OK TO CONTINUE, AX QUIT TO STOP". RECOVER activity will either continue or stop based on the given response to the message.

BRIEF SUMMARY OF THE INVENTION

The object of this invention is to provide a feature to verify a database copy marked as being in a state of QUIESCE. This will prevent the waste of time during subsequent recovery operations if inaccurate data has been allowed to accumulate.

In order to accomplish this objective, a database system process is provided and referred to as "QUIESCE" and according to the presently-described system, this consists of a database utility command that communicates a "QUIESCE" request to an on-line database. The method of the present invention verifies whether or not a database copy has been marked as being in a state of QUIESCE. When the verify option is specified for either a DBDIRECTORY statement or a RECOVER statement, a verification process will be initiated to perform CHECKSUM and ADDRESS-CHECK on the selected structures of the database copy. This activity will be performed only if the database identified with the <db statement> specifies a database copy that is marked as being in a state of QUIESCE. This verification is being provided in order to allow verification of a database copy in a state of QUIESCE that is being used as a current source or will be a future recovery source.

When the QUIESCE command is issued, the following results are seen to occur in sequence: (a) a special utility program that issues the QUIESCE command waits until all active database transactions are complete, then (b) all applications in a transaction state will complete their current transactions, then (c) any application attempting to enter the transaction state is suspended with a specific message denoted "DATABASE IS QUIESCED—WAITING TO RESUME". Then, (d) all data and audit buffers are flushed to the disk during the creation of two specialized audited control points. Then (e) the database control file is marked as being in a QUIESCED state, and (f) the time-stamp at the time of the QUIESCE is stored in a database control file. Then (g) the utility program, that issued the QUIESCE command, completes with a message stating "DATABASE QUIESCED". Here, then (h) the database remains in a QUIESCED state, allowing Read only access by users of the database until the utility program issues a RESUME command, after which all normal Write and Read operations can be operational.

If the mirrored target secondary disk storage system is separated from the primary source storage system by performing a split of the mirror system between the two storage devices, the physically consistent copy of the database in QUIESCE state will remain in QUIESCE state, even as the primary database system (which resides on the primary storage system) is allowed to RESUME database update activity. The physically consistent copy of the database in QUIESCE state, referred to as a Quiesce Database Copy or QDC, may be used to perform database maintenance activities or may be used in the event of damage to the primary database system, as a recovery source to replace the primary database system.

Prior to using the QDC as a recovery source, the copy can be checked for integrity at a physical level for CHECKSUM or ADDRESSCHECK failures by utilizing the VERIFY option with the database utility program. This integrity check can be done using the DBDIRECTORY command for reporting on the physical rows of database structures or as a pre-verification phase of the RECOVER command for a REBUILD or TAPECLONE recovery.

GLOSSARY ITEMS

Figure 1:
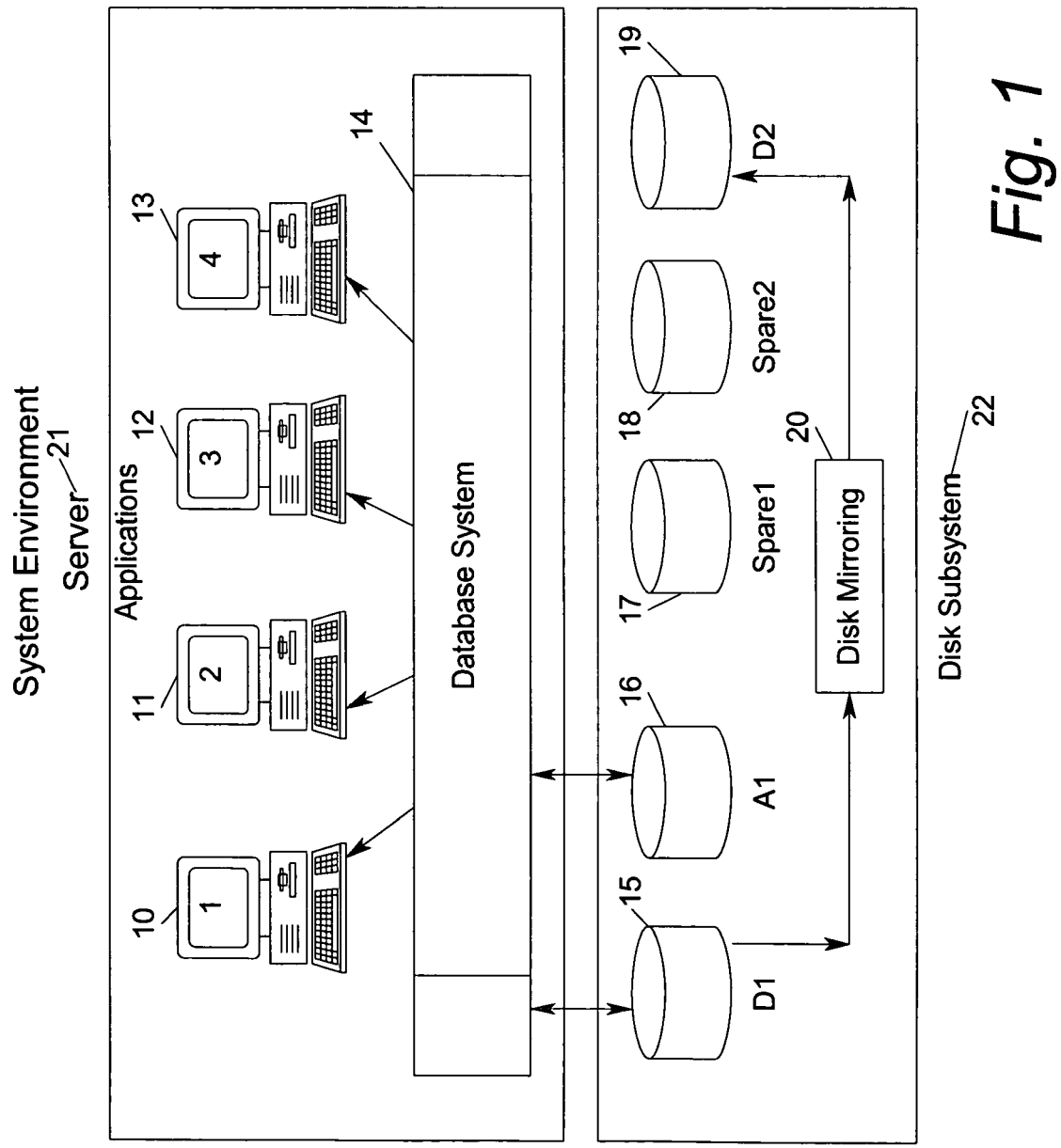
FIG. 1 is a drawing of the operating system environment showing a server connected to a disk subsystem and the types of information held therein to create a mirrored database snapshot.

1. ACCESSROUTINES: The software component of DMSII product that is primarily responsible for the accessing (creating, modifying and deleting) of data in a DMSII database. The Accessroutines is also responsible for auditing all changes to the database.

2. ACR: See Accessroutines.

3. ACTIVE TRANSACTIONS COMPLETED: See QUIET POINT.

4. ADMINISTRATIVE OPTIONS: In an RDB system, user-interface options that initiate administrative tasks.

5. ADDRESSCHECK: An addresscheck operation is a way of validating data files on disk. Each time a data block is written to disk the physical address of the data block is included in an ADDRESSCHECK area in the data block. Each time a data block is read, the physical location of the requested data block can be checked against the value in the ADDRESSCHECK area to confirm the validity of the data read. If the values are not identical, the data block is identified as having an ADDRESSCHECK error.

6. APPLICATION DEVELOPMENT: The activity of writing and testing database applications.

7. APPLICATION TRANSACTION STATE: The condition every update program of an audited database must enter in order to perform any data record update statements (e.g., STORE, DELETE, etc.).

8. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit Block is specified in the DASDL (Data And Structure Development Language) for each individual database; with the Extended Edition, it is possible for the ACR to extend this size dynamically. The size of an audit Block is "rounded up" to fit into an integral number of disk sectors; it could occupy as few as 1 sector or (in the extreme) as many sectors as are in a disk row (specified in the DASDL via AreaSize).

9. AUDIT BUFFER: A system memory buffer maintained by the DMSII software into which an audit Block is placed for ACCESSROUTINES access.

10. AUDIT FILE: Logically considered to be the sequential storage of Audit Records. Actually, the sequential storage of Audit Blocks which contain the Audit Records.

11. AUDIT RECORD: A structured package of data built somewhere within the ACR (Access Routine) and stored (sequentially) into the Audit File. Header and trailer words of the record contain, among other things, the length and type of record.

12. AUDIT SECTION: With the Extended Edition, multiple MCP (Master Control Program) disk files can be used to physically implement a single Audit File. Each of these disk files is referred to as a Section of the Audit File. The sequence of Audit Blocks is spread, round robin fashion, among the multiple Audit Sections.

13. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN (Audit File Number) value, although they each have a unique section number within their Audit File.

14. AUDIT TRANSFER: In an RDB (Remote Data Base) system, a method of transmitting audit images from the source host to the target host.

15. AUDITED CONTROL POINTS: See CONTROL POINTS.

16. AVAILABLE SPACE DIRECTORY: An area of some database data files which represents a directory of blocks of data within the file which are available to be re-used for updates to the data file. This space generally represents data that has been deleted from the data file.

17. BACKUP: A copy of the primary database files stored on magnetic tape or disk storage.

18. BCV: An acronym for Business Continuation Volume. EMC provides the ability to create a duplicate of a disk which can then be processed independently of the original disk. The duplicate is called a Business Continuation Volume (BCV). A BCV contains a mirror image of an active production volume. The BCV can be separated from the production volume, allowing separate tasks to operate on independent data images.

19. BI: Business Initiative.

20. BNA NETWORK: The network architecture used on Unisys ClearPath Enterprise Servers to connect multiple, independent, compatible computer systems into a network for distributed processing and resource sharing.

21. CERTIFICATION: The process of verifying the physical consistency of a database or portion of a database.

22. CHECKSUM: A checksum operation is a way of checking for I/O errors. Each data block in a data file will have a space allocated to control the CHECKSUM activity. Before the data block is written to the disk, this space is set to a pre-defined value in memory. Then the memory space holding the data is subjected to a CHECKSUM function, as supplied by the MCP. The resulting checksum value is then stored into the CHECKSUM area, and the data buffer in memory is written to the data file on disk.

23. CHECKSUM VERIFICATION: When a data block is read from disk into memory, the CHECKSUM area value is saved into a variable for later checking. Then the area is set to a pre-defined value, and the memory space holding the data is subjected to a CHECKSUM function. The resulting checksum value is compared with the value stored from the original value stored from the CHECKSUM area. If the values are not identical, the data block is identified as having a Checksum Error.

24. CONFIGURATION OPTIONS: In an RDB (Remote Database Backup) system, user-interface options that initiate configuration tasks.

25. CONTROL POINT: A logical construct within the Unisys Enterprise Database Server used to limit the number of audit records which must be reprocessed in the event of a system failure. Data buffers which have been modified are guaranteed to be written to disk at least once every two control points, thus halt/load recovery need only process changes since the second to last control point (FIG. 4) in an audit trail. Control Points occur on a user-specified frequency defined in SYNC points (See Glossary #83).

26. CSC: Customer Support Center. The Unisys organization tasked with answering customer questions and problem resolution. CSC is the first line of support for customers after consultation with any on-site representatives.

27. DASDL: Data And Structure Definition Language. The language used to specify the structure and specific software configuration for a database.

28. DB DIRECTORY STATEMENT: The DBDIRECTORY statement is a statement supported in the DMUTILITY program which is used to produce a report on the status of the files and rows selected. This report identifies any errors that have been reported in the disk file header of the data files selected.

29. DATABASE ANALYSIS: The process of analyzing the physical structure of database files.

30. DATABASE AVAILABILITY: The availability of data files within a database system.

31. DATABASE CONTROL FILE: A special file required by the DMSII software on all databases. System-level information is stored in the Control File which the ACCESSROUTINES use to manage the database. The Control File also provides a place for exclusive users of the database, such as DMUTILITY to mark the database as unavailable.

32. DATABASE EXTRACTIONS: Data that is read from a database.

33. DATABASE INTEGRITY TESTING: The process of testing the physical consistency of data files within a database.

34. DATABASE PROCESSING: Database processing in a mirrored disk environment.

35. DATABASE STACK: A database stack is the running database that results when an application opens a database, thereby initiating a database stack.

36. DATABUFFER: A system memory buffer maintained by the DMSII software into which a data Block is placed for ACCESSROUTINES access.

37. DATA SET: A disk file (potentially, a group of disk files) containing data records all in a similar format. A Unisys Enterprise Database Server structure type declared in DASDL (Data And Structure Definition Language).

38. DATA BLOCKS: Data Blocks are made up of 1 or more records of data as defined for a data structure in a DASDL database specification for a particular structure. A data file is made up of multiple data blocks.

39. DATA WAREHOUSING: A copy of data specifically structured for querying and reporting.

40. DBA: DataBase Administrator. The person within an organization who is responsible for the development, maintenance, and security of databases.

41. DISASTER RECOVERY: The recovery of any event that had created an inability for an organization to provide critical business functions and data for some predetermined period of time. Generally, this involves reconstituting database files which were lost or unavailable.

42. DISK FILE HEADER: Disk File Headers contain the attributes that define disk files, including such information as file title, actual location of each area of the file, record sizes, block size, and so on. This information is used primarily by the MCP and logical-I/O routines.

43. DISK ROW: The minimum allocation of disk space via the MCP (Master Control Program). A disk file is composed of a sequence of disk rows that may occupy arbitrary locations on the disk media. Within a disk row, all Blocks are allocated at sequential disk addresses.

44. DATA MANAGEMENT SYSTEM II (DMSII): A specialized system software package used to describe a database and maintain the relationships among the data elements in the database. Described in Unisys Publication Part No. 8807 6625-000, September 1997, entitled "Unisys Getting Started With DMSII".

45. DM UTILITY COMMANDS: Commands used to manage a physical database.

46. DMSII: See Data Management System II.

47. DMUTILITY: This is a program which will parse the new syntax to scan for the Exclude keyword and to build a dump list to reflect that specific disjoint data set and all of its sublevel structures which are to be excluded from the dump.

48. DMSII DATA FILE: A data file is the physical representation of a database structure defined in a DASDL database specification. The term data file generally refers to a logical representation of a data structure, and may actually be multiple data files.

49. EMC: A global enterprise storage company.

50. EMC SRDF: See SYMMETRIX REMOTE DATA FACILITY.

51. EMC TIMEFINDER: A business continuance solution which allows customers to use special devices that contain a copy of Symmetrix devices from an attached host(s) while the standard Symmetrix devices are on-line for regular I/O operation from their host(s).

52. FLUSHING TO DISK: The process of writing system memory buffers (data and/or audit) to disk.

53. FUTURE TRANSACTIONS SUSPENDED: The process of preventing database applications from entering a transaction state.

54. EMP: Heterogeneous Multi-Processor.

55. INTEGRATION TEST: The act of combining individual units and components, and then testing them to ensure that the individual units and components still function as expected.

56. LOGICALLY CONSISTENT DATABASE: An online database whose consistency is maintained by data buffers and physical data files.

57. MARC: Menu Assisted Resource Control. A menu-based interface to Unisys A Series systems for the purpose of entering system commands.

58. MCP/AS: Unisys Master Control Program/Advanced Systems. The comprehensive virtual memory operating system which drives the Unisys A Series family of hardware.

59. MCP ENTERPRISE SERVER REMOTE DATABASE: In an RDB (Remote Data Backup) system, the database copy that resides at the remote host.

60. MCP TO RDB DATABASE OPERATIONS CENTER GUI: The complete set of Remote Database Backup Operations (Configuration, Administrative, and Monitoring) contained within the Database Operations Center graphical user interface.

61. MIRROR FAMILY: One or more physical disks that share a family name and contain mirrored images of all data from a source family of disks.

62. MIRRORED AUDIT TRANSFER: In an RDB (Remote Data Backup) system, a method of audit transfer where target audit data is available on a mirrored family of disks.

63. MIRRORED COPY: See MIRROR FAMILY.

64. MIRRORED DATA TRANSFER: A method of maintaining a mirrored family of disks containing data files.

65. MIRRORED DISK: A disk which is a mirror image of its source disk (e.g. Family Name, Serial number and capacity are identical).

66. MIRRORED SNAPSHOT: A mirrored copy of data that is split from its source data.

67. MONITORING OPTIONS: In an RDB system, user interface options that initiate the monitoring of audit generation and audit transfer activities.

68. OFFLINE DATABASE SYSTEM: A database system that is in a state of inactivity whereby no data files are being accessed from the database.

69. OFFLOAD PROCESSING: The process of dividing database access activities by creating one or more copies of a database.

70. ONLINE IN DATABASE SYSTEM: A database system that is in a state of activity whereby data files are being accessed from and/or modified to the database.

71. PDS: Product Definition System: The Unisys internal system containing ordering and configuration information for all Unisys products.

72. PHYSICALLY CONSISTENT DATABASE: A database whose consistency is established when no applications are in a transaction state and all data buffers are flushed to disk.

73. POINT-IN-TIME SNAPSHOT: A mirrored snapshot that is split at a specific point in time.

74. QUIESCE: The act of requesting that a database be put in a state of QUIESCE. See Quiesce Database.

75. QUIESCE DATABASE: A database that is in a physically consistent state, i.e., all data buffers are flushed to disk.

76. QUIET POINT: Location in the Audit trail where no program is in transaction state.

77. RDB: Remote Database Backup. A Unisys product which provides real-time backup services for DMSII database as part of a disaster recovery plan. Remote Database Backup is suitable for use with A Series Databases.

78. REAL TIME REMOTE DATABASE ACCESS: Access to a remote database copy while the copy is kept current with its source database.

79. RECOVER STATEMENT: The RECOVER statement is a statement supported in the DMUTILITY program which is used to initiate all manual forms of recovery for audited databases; that is, all forms of recovery with the exception of halt/load recovery and recovery from abnormal termination of an application, which is referred to as abort recovery. Both halt/load recovery and abort recovery are initiated automatically. Manual forms of recovery may be partial database recovery or whole database recovery. Whole database recovery includes a RECOVER statement where REBUILD, REPLICATE, ROLLBACK, or TAPECLONE has been specified. TAPECLONE recovery is supported only with the Remote Database Backup system, and is a special form of REBUILD.

80. RECOVERY ACTIVITY: The resulting activity that results from a DMUTILITY RECOVER COMMAND, including the initiation of programs related to performing the recovery and the audit that is generated by the programs due to the initiation of the RECOVER command.

81. REGRESSION TEST: A representative subset of functionality tests to ensure stability and accuracy following the insertion or modification of code.

82. REMOTE COPY AUDIT: The activity of backing up a remote audit file that is a copy of its source.

83. SAN: Storage Area Network.

84. SAN MIRROR DISK MANAGER: A Unisys ClearPath system software feature that makes it possible to split off a copy of a disk family within the same MCP (Master Control Program) environment as the source volumes, regardless of the type of disk.

85. SCHEDULED BACKUP: A backup that is scheduled to be performed at a predetermined time.

86. SINGLE HOST BACKUP: A backup that occurs at the same host as its database source.

87. SNAPSHOT COPY: The term "snapshot copy" is used to identify a copy of an MCP (Master Control Program) family which has been provided unique identification. This allows the "snapshot copy" to coexist within the same MCP environment as its original.

88. SOURCE COPY: In a mirrored database environment, the initial database copy that is mirrored onto a target database.

89. SPLIT MIRRORS: Target mirrored disk copies that are split from their original (source).

90. SSR: System Software Release. A package of system software and related documentation that is periodically released to the field for A Unisys Series computer systems.

91. STORE SAFE: A storage software feature that enables a site to ensure that multiple copies (mirrors) of disk data are coherent.

92. STORE SAFE MEMBER: A member of a mirrored set that has been assigned a store safe name.

93. SYMMETRIX: EMC corporation's enterprise storage system.

94. SYMMETRIX I: In an SRDF (Symmetrix Remote Data Facility) environment, the disk storage subsystem that represents the source (primary).

95. SYMMETRIX II: In an SRDF environment, the disk storage subsystem that represents the target ( ).

96. SYMMETRIX REMOTE DATA FACILITY (SRDF): EMC's disk-mirroring software solution for use with Symmetrix hardware.

97. SYNC POINT: A quiet point (in the audit trail) that is forced to occur every "n" transactions; here Audit buffers are flushed.

98. TASK ASSIGNMENT TABLE: This table is built by identifying all of the disk rows for all of the data files to be handled and arranging them in a table in memory. This table can be broken up into parts, assigning each task a portion of the table, so that processing can occur in parallel, thereby reducing the time to finish all of the processing.

99. TRACKER: An asynchronous RDB (Remote Database Backup) task declared and processed from Accessroutines. It's function is to rebuild the database.

100. TRANSACTION: A cycle which starts with a Read or a Write operation and continuing until completion. Thus, Read data is accessed by the Requestor or the Write data is flushed to reside onto the database disk.

101. TAPECLONE COMMAND: See RECOVER COMMAND

102. UCF: User Communication Form. A form used by a Unisys customer to report problems and express comments about Unisys products to support organizations.

103. VDBS: Visible DataBase Stack. A set of commands which are issued directly to a database stack to interrogate or change some aspect of the database configuration.

104. SYSTEM BACKUP PROCESSOR: A system program of the MCP system which provides the ability to process output printer files generated by applications running in an MCP operating system environment.

Notes:

EMC=Trademark TM of EMC Corp.

Symmetrix is a copyright of EMC.

SRDF=TM of EMC.

ClearPath=TM of Unisys.

Windows NT—Copyright of Microsoft.

DETAILED DESCRIPTION

FIG. 1 is a drawing showing the system environment of a method and system for database recovery using a mirrored snapshot of an online database. One main server 21 is shown, which is used to run several different applications and utilizes the personal computer client-users 10, 11, 12, and 13, which interact with and access the primary database system 14.

Within the disk subsystem 22, the data files contained in Disk 15 (D1) are in communication with the database system 14, and sent via the disk mirroring system 20 to disk 19, (D2). The data files contained in disk D1 can be a "family" of disks, as opposed to just one disk. QUIESCED means that the database system has flushed all of the audit and data buffers to create a physically consistent state and causes the data files pertaining to that database on disk D1 to be left alone and not available for update access. Therefore, if D1 contains a "family" of ten disks, the mirrored copy D2 must also contain a "family" snapshot of ten disks. Once the data files have been mirrored to D2 and QUIESCEED, then disk D2 can be used in place of D1 (RDBDISK). Therefore, if the disk D1 (RDBDISK) is flushed and goes offline, a mirrored copy is readily available in disk D2. The audit files within disk 16, (A1) are in communication with the database system 14. Also within the disk subsystem 22, there exist two spare disks 17 and 18, which could be suitably used to hold copies of the database 19 (D2). The spares 17 and 18 can also b brought online to increase the size of disk D1, and store non-related databases, and used for storage of application files. The DMUTILITY is part of the suite of software components that make up a Database System.

Figure 2:
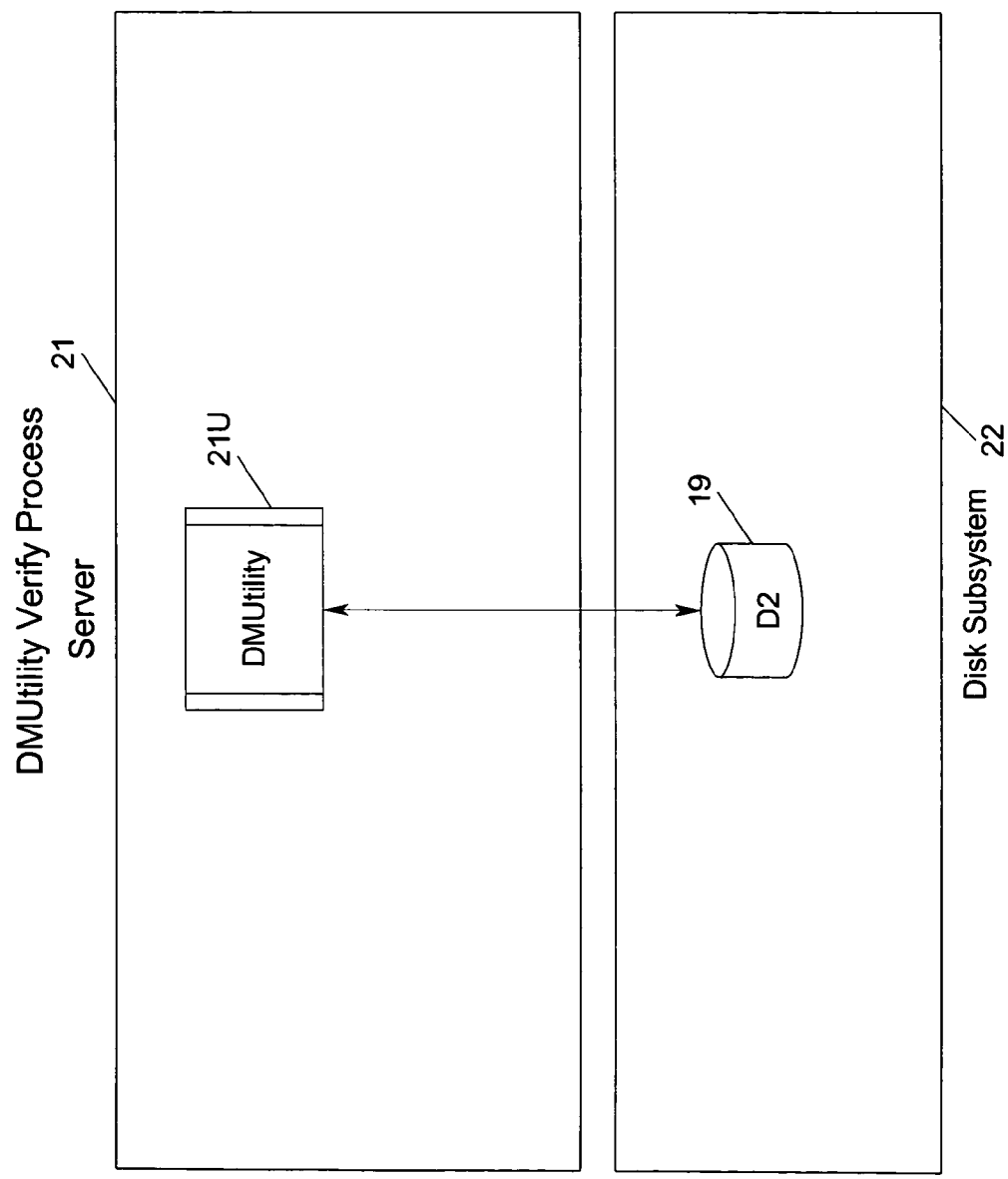
FIG. 2 is a schematic drawing showing the DMUTILITY VERIFY process.

FIG. 2 illustrates the schematic drawings of the process to verify the data in D2 (19). This drawing includes a Server 21, which includes the DMUTILITY 21U, as well as a disk subsystem 22, which includes a D2 disk (19). The DMUTILITY program sands and receives data from the disk D2 (19). The verification process is to read the data from the disk D2 into the memory buffers of DMUTILITY 21U, and to process the CHECKSUM and ADDRESSCHECK verifications upon those memory buffers. The DMUTILITY program is a part of the Database System Software, and is used for many database related tasks. When the process is complete, a completion message is issued, and the rest of the commands are processed if there were no errors. IF there ware errors during a RECOVER command with the VERIFY option, then there must be a manual acknowledgement of the error with a determination to instruct the DMUTILITY program to continue or quit.

It is important to note that FIG. 2 shows the relationship between the DMUTILITY program 21U and the files that comprise the database on D2. DMUTILITY reads the physical rows of data from the database files from D2 into memory for the purpose of performing CHECKSUM and ADDRESSCHECK verification. If the verification fails, the row is marked as unavailable in a manner that is consistent with the same processing that is done when the DMUTILITY program performs a Database Backup DUMP and encounters the same error. Each verification error that is encountered is reported both with a system message and within the traditional output file that the DMUTILITY program creates. Completion of the VERIFY option is noted with a system message as well as a message in the output file, noting the number of errors encountered. In the event that errors were encountered by the VERIFY option in combination with the RECOVER or TAPECLONE commands, the RECOVER or TAPECLONE command will not continue until a manual acknowledgement is made to the DMUTILITY program instructing it whether it is OK to continue or QUIT.

Figure 3:
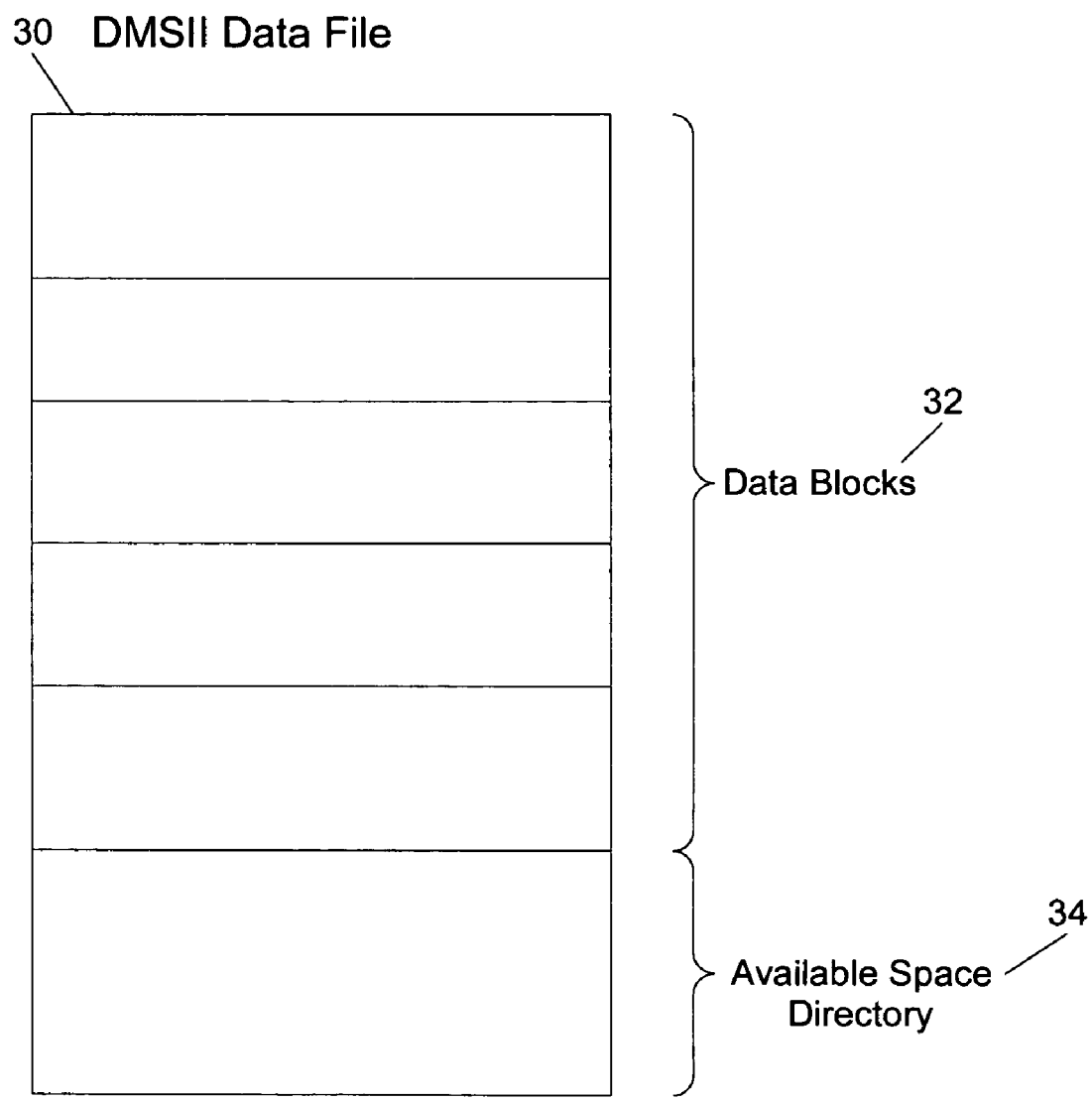
FIG. 3 is a schematic drawing of a DMSII data file and the types of information held therein.
Figure 4:
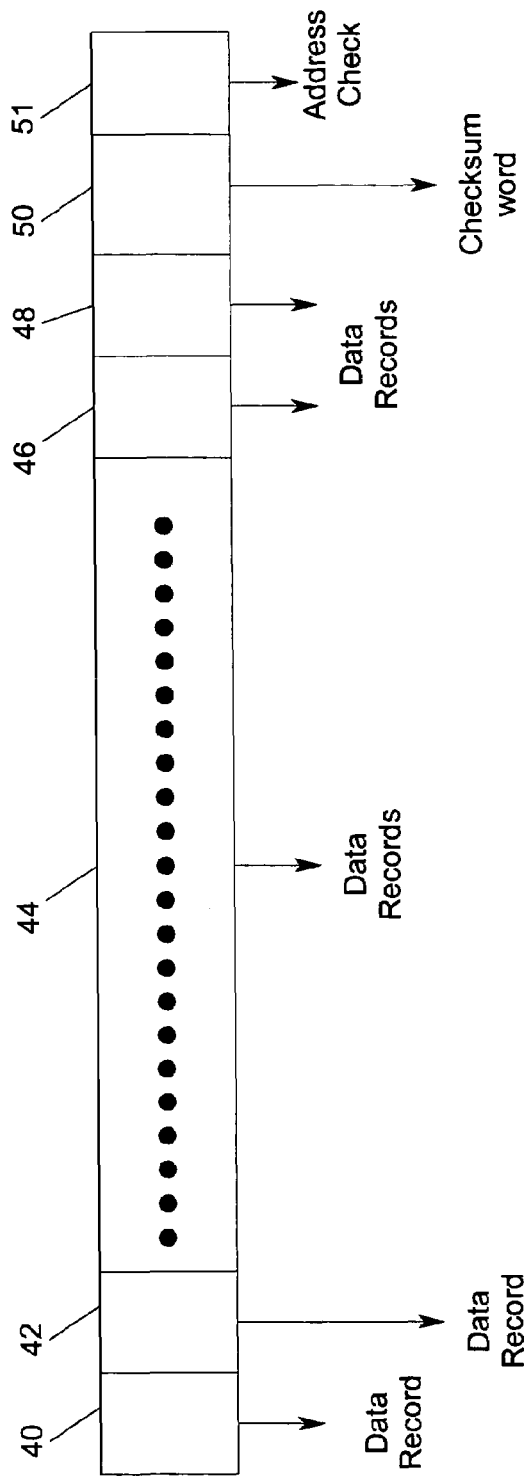
FIG. 4 is a schematic drawing of a DMSII data Block and the types of information held therein.

FIG. 3 is a schematic drawing of a DMSII data file and the types of information held therein. A DMSII Data file 30 exists with information such as data Blocks 32, and available space directory 34. A data block is actually a block of data, a block meaning a distinct location which holds one or more data records. A diagram of data block is shown in FIG. 4. The data stored in these data blocks represents the data stored by a user application in a format defined by the database structure in the DASDL specification.

FIG. 4 is a schematic drawing of a DMSII data block of a data file, and the general locations of the data records with respect to the CHECKSUM validation word and ADDRESSCHECK word. This illustration includes blocks of data records (40, 42, 44, 46, and 48), a Checksum word 50, and an ADDRESSCHECK word 51. It should be noted that this is a layout of a database data block on disk. This data is written to the disk by the Database System at the request of a user application, containing data that the user application specified. The VERIFY option will read a block of data, perform verification tasks, and then report errors, if required.

Figure 5:
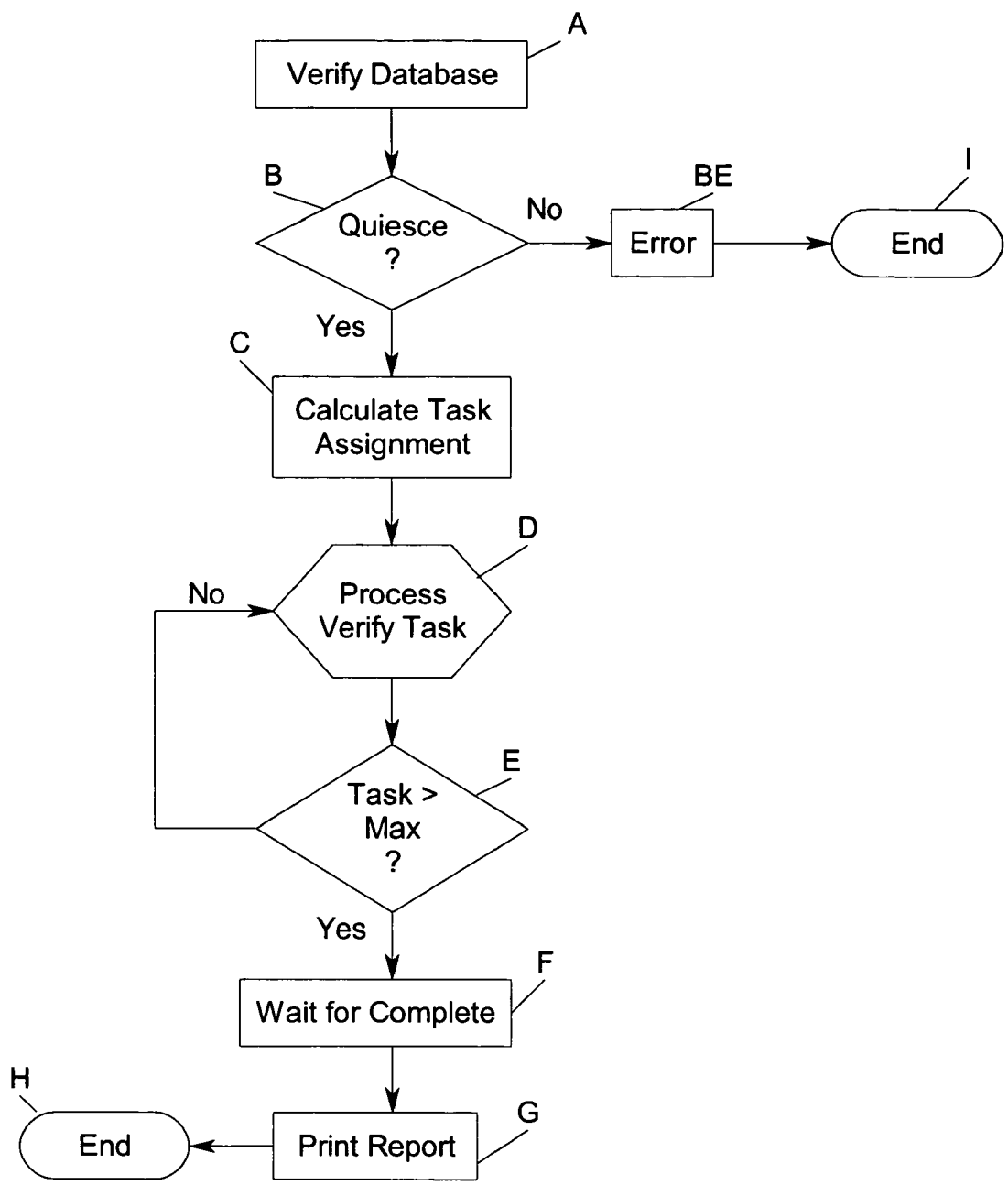
FIG. 5 is a flowchart showing the steps involved to perform verification for a database copy marked as being in state of QUIESCE.

FIG. 5 is a flowchart showing the steps involved to perform verification for a database copy such as D2 (19 of FIG. 1) marked as being in state of QUIESCE. The process begins at step A, labeled Verify Database. An inquiry is then made at step B to check if the database has been Quiesced. If the database has not been Quiesced, (NO) an error occurs at step BE, the error is reported and the process ends. If the database has been Quieaced, (YES) the task assignment is calculated (Step C) by setting up a table of all of the disk rows of all of the disk files specified to be verified. Next, a loop is performed to initiate independent processes until the number of independent tasks initiated is greater than the maximum number of tasks (Max) specified to complete the verification (STEPS D & E), each independent process being assigned a set of tasks from the task assignment table. The max is the value that is user settable with the optional VERIFYTASKS option. It should be noted that the default value is 1, and the maximum is 50. This value is used to process that number of Verify Tasks to perform the verification in parallel, thereby completing the Verification more quickly, but using more system resources. If the task is not greater than the max, the process returns to verify task process (Step D). If the task is greater than the max (Yes), this verify process will wait for completion of all of the independent process at step F, a report is printed (Stop G), and the process ends at step H. It is important to note that the process is not considered complete until all of the processed Verify Tasks have all been completed. What is meant by Process a Verify Task is that the Verify Database part of the DMUTILITY program actually starts separately running tasks to independently perform the verification of data blocks. The separately running tasks (Step D of FIG. 5) are charted, and can be seen in further detail in FIG. 6, Verify Task. At this point, the system has accomplished a verification process, and since it is completed, there is a report and a message.

There is no permanent record within the database that the verification was done. The report is part of the standard DMUTILITY output file that is produced for any command that is requested. It is generated as a backup printer file, that can be viewed online with the System Backup Processor or sent to a printer. The verification report indicates the data blocks that were marked as unavailable (if any).

One use for this information of a database copy that has bad data blocks is that it can be used to further test the original copy of the database, in order to repair those data blocks. Bad data blocks in the copy may mean bad blocks in the original database. Another reason to verify the database copy is in preparation to use the database copy as a viable recovery source with the RECOVER command. If the copy has bad rows, the resulting recovery will produce a database with the same bad blocks.

Figure 6:
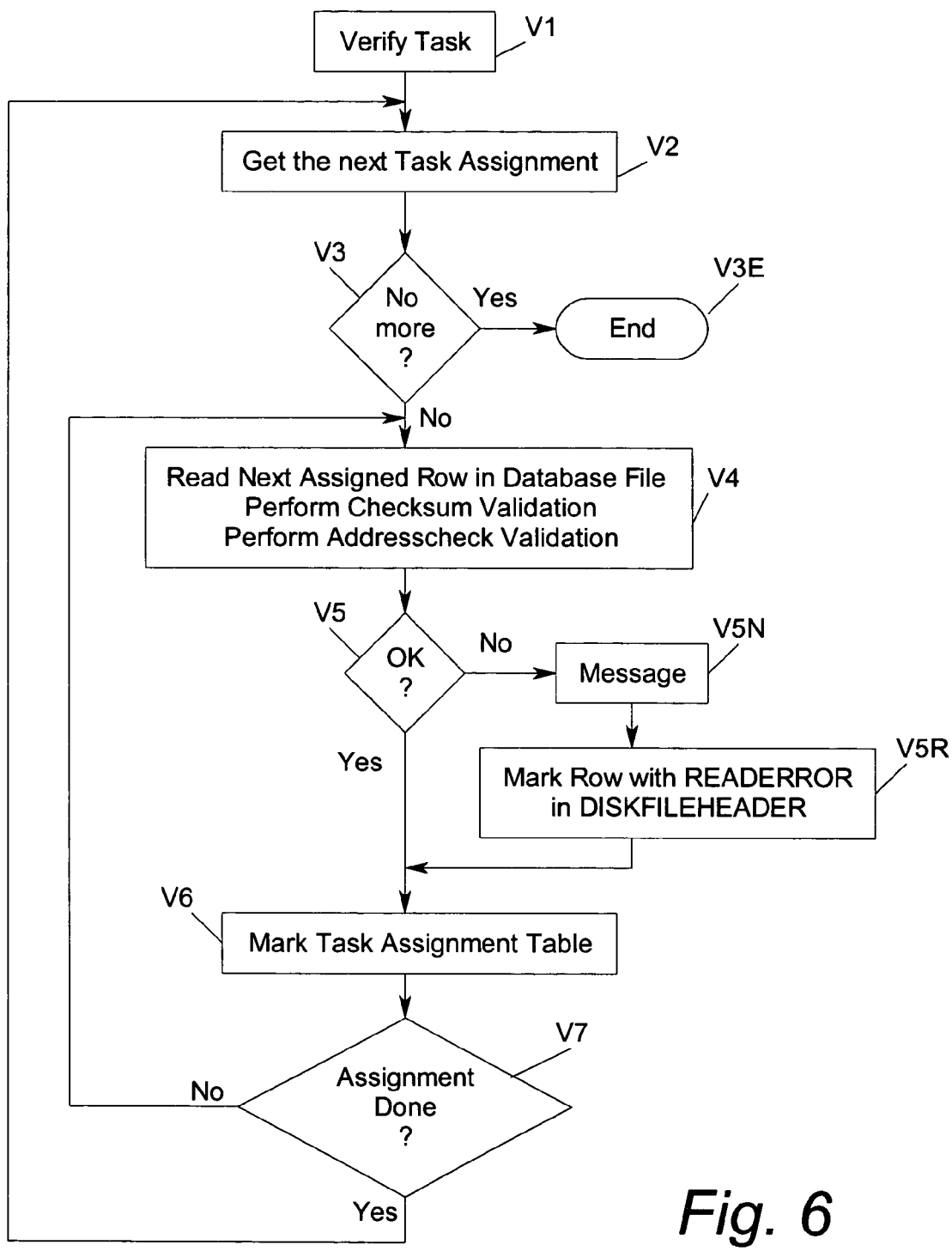
FIG. 6 is a flowchart showing the steps that each independent task performs integrity checks for every Block of every structure.

FIG. 6 is a flowchart showing the steps that each independent task performs doing integrity checks for every Block of every structure in a database copy. The Verify Task starts at step V1, where it requests a next Task assignment from the assignment table to begin the verification process (Step V2). An inquiry is made (Step V3) to se if a task assignment was returned or a NO MORE result. If there are "no more" (Yes to inquiry V3), the process ends at step V3E. If there are more tasks (No), the next assigned row in the database file of the current task assignment is read and a CHECKSUM and/or ADDRESSCHECK verification are performed, where indicated (Step V4).

An inquiry is made to check if this process went ok (Step V5). If the Checksum verification or ADDRESSCHECK verification produced an error (No to inquiry V5), a message is produced (Step V5N), and the row is marked with a READERROR in DISKFILEHEADER of the data file (Step V5R).

Whether an error was reported or not, the process then continues at V6 to update the assignment table indicating that verification of the row is complete using the standard method within the DMUTILITY program, and a check is made to determine whether the current task assignment is completed (Step V7). If the current task assignment is completed (Yes to inquiry V7), the process returns back to step V2 to get the next task assignment, otherwise the process returns to V4 to Verify the next assigned data block. This process continues for each of the independently running verification tasks until the assignments become exhausted and the check at V3 will be Yes and the independent task will end (V3E). When all of the independent tasks have finished, the Wait for Complete state at F in FIG. 5 will resume processing, display the completion message, print the report and exit, completing the Verify option.

While one embodiment of the described system and method has been illustrated, it should be understood that the invention may be implemented in other embodiments as defined in the attached claims.

What is claimed is:

1. A method for the verification of a quiesced database copy of a primary database by executing a number of independent tasks from an assignment table, said verification to prevent the waste of time during subsequent recovery operations if inaccurate data has been allowed to accumulate, comprising the steps of:
    (a) establishing a secondary database copy which replicates said primary database holding data blocks;
    (b) quiescing said secondary database copy so that no update access to said database copy is operable;
    (c) utilizing a Verify option in a database utility program to check said quiesced secondary database copy for integrity said step including the steps of:
        (c1) checking each row in said quiesced database copy to perform a checksum verification;
        (c2) checking each row in said quiesced database copy to perform an addresscheck verification;
    (d) utilizing a VERIFY TASKS option to control said number of independent tasks assigned to perform said check of said quiesced database copy for integrity.

2. The method of claim 1 which further includes the steps of:
    (e) validating the integrity of said secondary database copy by reporting errors that occur during verification;
    (f) using the integrity-verified quiesced database copy as a recovery source of data.

3. In a network of multiple processors (10–13) for executing applications and connected to a database system (14) which utilizes a DM UTILITY program and which operates with a Disk Subsystem (22) having a primary database (15) which is duplicated by a disk mirroring system (20) to a quiesced database copy (19) which carries a series of data blocks, a system for verifying the integrity of said quiesced database copy (19) before allowing usage for access, comprising:
    (a) means for replicating said primary database (15) with a quiesced database copy (19);
    (b) means to disable access by said applications (10–13) to said quiesced database copy (19);
    (c) means to verify the data integrity of said quiesced database copy (19) including the steps of:
        (c1) means to execute a checksum verification of each data block in said database copy (19);
        (c2) means to perform an Addresscheck operation on each data block in said quiesced database copy (19);
    (d) means to establish data access to said quiesced database copy (19) after verification of the integrity of said database copy (19).

4. The system of claim 3 where said means (c) to verify includes:
    (sc1) means to check that said duplicated database (19) is in a state of quiesce;
    (sc2) means for accessing an assignment table of tasks required for verification;
    (sc3) means for utilizing a Verify database portion of said DMUTILITY program to select tasks to perform verification of each selected data block in said quiesced database copy;
    (sc4) means to generate a verification report.

5. The system of claim 4 wherein said means (sc4) to generate a verification report includes:
    (sc4a) means to indicate which data blocks were integrity-verified and which blocks were marked as unavailable.

6. The system of claim 5 where said means (sc4a) to indicate includes:
    (sc4a1) means to enable further reporting of said database to initiate a repair of said unavailable blocks.

7. The system of claim 5 where said means (sc4a1) includes:
    (i) means to mark a checked row with a READERROR in a DISKFILEHEADER if a checksum or addresscheck verification indicated an error.

* * * * *